Patented Aug. 25, 1953

2,650,208

UNITED STATES PATENT OFFICE 2,650,208

STABILIZERS FOR RUBBER AND SYNTHETIC POLYMERS

William F. Arey, Jr., and Robert E. Wood, Baton Rouge, La., assignors to Standard Oil Development Company, a corporation of Delaware No Drawing. Application October 18, 1949, Serial No. 122,136

13 Claims. (Cl. 260—45.95)

This invention relates to elastomers subject to deterioration in the presence of oxygen, and it relates more particularly to elastomers containing addition agents suitable for retarding their deterioration.

In accordance with the present invention, a new class of organic derivatives is described which are particularly useful as stabilizing agents for elastomers.

The new class of antioxidant compounds are condensation products of polyhydric phenols with diolefins. The condensation is carried out in such a manner that the product contains up to two aromatic rings.

Suitable polyhydric phenols include resorcinol, catechol, hydroquinone, pyrogallol, phloroglucinol, etc. Phenol, itself, may also be used, but the product obtained is inferior to other known antioxidants for rubber. This may be improved by condensing the diolefin with alkylated phenol or alkylating the product obtained. However, in this case, the product is no better than commercially available antioxidants.

Suitable diolefins include butadiene, isoprene, piperylene, dimethyl butadiene, myrcene, dimethallyl and the like. The condensation is carried out under pressure at a temperature above 100° F. in the presence of a hydrate of a Friedel-Crafts type catalyst, such as $FeCl_3.6H_2O$, $AlCl_3.6H_2O$, $AlBr_3.6H_2O$, $SnCl_4.6H_2O$, etc., until reaction is substantially complete. The diolefin should be in excess of a 1/1 mol ratio of diolefin to phenol.

Generally, the additives of the present invention are most advantageously blended with the elastomer base stocks in concentration between 0.1 and 2% by weight of the elastomer, although larger amounts may be used for some purposes. The exact amount of addition agent required for maximum improvement depends to a certain extent on the particular products used, and the nature of the elastomer base stock.

Any of the common elastomers (as defined by Fisher in his article of the August 1939 issue of "Industrial and Engineering Chemistry," on page 941, under the heading, "Nomenclature of synthetic rubber") (see also Hackh's Chemical Dictionary, Third Edition, page 295) are suitable as raw materials for the present invention. The preferred elastomer is the low temperature interpolymer of isobutylene with a multiolefin having from 4 to 14 carbon atoms per molecule, such as butadiene, isoprene, dimethyl butadiene, myrcene, dimethallyl, or the like. This copolymer is prepared by cooling the olefinic material to a temperature within the range between —50° C. and —103° C.; the mixture being made up with a major proportion of isobutylene and a minor proportion of the diolefin; then treating the cold mixture with a solution of a Friedel-Crafts catalyst in solution in a low-freezing, non-complex-forming solvent, such as a solution of aluminum chloride in a halo-substituted aliphatic compound such as ethyl or methyl chloride or ethylene dichloride or chloroform, or the like, as shown in United States Patents Nos. 2,356,127 and 2,356,128.

The reaction proceeds promptly to yield the desired copolymer. It may be noted that in this reaction the preferred isoolefin is isobutylene, but that a wide choice of multiolefins is possible as above pointed out.

For the catalyst, any of the Friedel-Crafts catalysts disclosed by N. O. Calloway in his article on "The Friedel-Crafts synthesis," printed in the issue of "Chemical Reviews," published for the American Chemical Society at Baltimore, in 1935, in volume XVII, No. 3, the article beginning on page 327, the list being particularly well shown on page 375, may be used. The solvent to be low-freezing must have a freezing point below 0° C.; to be non-complex forming, there shall not separate from the solution on evaporation of the solvent a compound between the solvent and the Friedel-Crafts catalyst. All of the aliphatic halo-substituted compounds having freezing points below 0° C. are usable as catalyst solvents without regard of the number of halo-substituents or the particular halogen used, and for the purposes of this application all are defined as "alkyl halides." Similarly, carbon disulfide and its analogs and homologs are also usable. With some of the Friedel-Crafts compounds, especially boron trifluoride, and aluminum bromide, the lower hydrocarbons such as ethane, ethylene, propane, butane, and the like, are also excellent catalyst solvents, since they also are low-freezing and non-complex-forming. In addition to the active metal halides disclosed by Calloway, a considerable number of double salts are equally effective catalysts, including such substances as aluminum chlorobromide which has the potency of aluminum chloride and is soluble in hydrocarbons. Similarly, such compounds as aluminum or titanium chloro ethoxide are also usable as catalysts in this reaction.

The resulting polymer is a solid having a Staudinger molecular weight number within the range between about 20,000 and 150,000; a minimum molecular weight of about 20,000 being necessary for a curing reaction. The preferred range of molecular weight is from 35,000 to about 85,000, since polymers lower than 35,000 are undesirably low in tensile strength, and polymers above 85,000 are too tough to mill readily. The polymer likewise shows a relatively very low iodine number (according to the WIJS' method) of from 0.5 to 50, the preferred range being between about 1 and 10. (The polymer, in spite of its very low unsaturation, is readily reactive with sulfur, particularly in the presence of curing aids, such as tetra methyl thiuram disulfide, in a curing reaction to yield a high-grade elastomer suitable for many of the uses to which rubber has previously been put.)

Alternatively, the emulsion interpolymers of butadiene with styrene or acrylonitrile; or of isoprene, either alone or with styrene or acrylonitrile; or dimethyl butadiene, alone or with styrene or acrylonitrile, are also usable as the basic elastomer. Likewise, isobutylene polymers and the emulsion polymers of chloroprene, are similarly useful. That is, any of the curable or non-curable rubber substances, including natural rubber, shown in the above-mentioned Fisher article are suitable for use as the raw material for the present invention.

A number of examples of the preparation of the new compounds of the present invention will be described in detail and data showing the effect of these additives in elastomer base stocks will also be given. It should be understood that these examples are given for illustrative purposes only and are not to be construed as limiting the scope of the invention in any way.

*Example I*

The following charge was placed in a pressure bottle:
 110 grams resorcinol
 108 grams butadiene
 3 grams FeCl$_3$.6H$_2$O The bottle was then attached to a rotating wheel in a water bath. The reaction mixture was heated to a temperature of 150° F. for 89 hours, at a pressure corresponding to the vapor pressure of butadiene at this temperature. At the end of this time, the bottle and contents were allowed to cool and the reaction mixture was transferred to a beaker. Excess butadiene was removed by heating on a steam bath. Weight of crude product was 155 grams. The reaction product was washed three times by adding 500 cc. water and heating on a steam bath while stirring the mixture and then decanting the water. The material was dissolved in isopropyl alcohol, filtered and then the solvent was removed by heating on a steam bath overnight.

The product thus obtained was a dark red (18 on the Gardner scale), viscous (Gardner viscosity of Z–10) liquid and amounted to 150 grams. It was very slightly soluble in sodium hydroxide solution. Molecular weight as determined by freezing point depression in benzene was 208. This value and stoichiometric considerations indicate the product to contain two resorcinol and between 1 and 2 butadiene residues.

*Example II*

Charge:
 110 grams resorcinol
 300 grams butadiene
 3 grams FeCl$_3$.6H$_2$O

Procedure same as in Example I except heating at 150° F. was for 64 hours. Yield of purified product was 150 grams.

*Example III*

Charge same as in Example I. Procedure same as in Example I except heating was for 5 hours. Yield of purified product was 120 grams; color: Gardner 18; viscosity: slightly greater than Gardner Z–10.

*Example IV*

Charge:
 110 grams catechol
 108 grams butadiene
 3 grams FeCl$_3$.6H$_2$O

Procedure as in Example II, gave 150 grams of black, rather viscous liquid that was exceedingly staining.

*Example V*

Charge
 25 grams resorcinol
 25 grams plant isoprene (96%)
 1 gram FeCl$_3$.6H$_2$O Procedure same as in Example I except heating at 150° F. was for 72 hours, and a viscous purple product was obtained, which was dissolved in 500 cc. of isopropanol, evaporated to dryness and washed twice with 500 cc. of hot water, and evaporated again to dryness, whereupon 50 grams of product were obtained.

*Example VI*

The condensation product obtained in Example I was dissolved in a small amount of isopropyl alcohol and the resulting solution emulsified in soap solution. This emulsion was then added to an uncoagulated latex obtained by the emulsion copolymerization of butadiene and acrylonitrile, the latex was coagulated by salt solution and dried at 165° F. for a period of 18 to 20 hours. The Mooney viscosity and Williams plasticity were determined on the uncured gum. The polymer was then compounded according to the following recipe.

| | Parts by weight |
|---|---|
| Polymer | 100 |
| Zinc oxide | 5 |
| Stearic acid | 1 |
| Benzothiazyl disulfide | 1 |
| Medium process channel black | 50 |

The compounded product was then cured for 45 minutes at 287° F. The following data were obtained in comparison with 2,6-di-tertiary-butyl-4-methyl phenol and phenylbeta-naphthylamine, both of which are oxidation inhibitors known to the art.

TABLE I

| Copolymer | | Stabilizer | | Drying Conditions | | 2 Minutes, Mooney Viscosity [3] | Williams Plasticity [2] | Cure | | |
|---|---|---|---|---|---|---|---|---|---|---|
| Sample | Type [1] | Type | Weight Percent on Polymer | Temp., °F. | Time, Hrs. | | | Tensile | Mod. @ 300% | Elong. |
| I | 26 | A | 1.0 | 165 | 20 | 19 | 57–0 | | | |
| I | 26 | B | 1.0 | 165 | 20 | 19 | 58–0 | | | |
| I | 26 | C | 1.0 | 165 | 20 | 19 | 59–0 | | | |
| I | 26 | A | 0.2 | 165 | 20 | 20 | 57–0 | | | |
| I | 26 | A | 0.1 | 165 | 20 | 19 | 58–1 | | | |
| II | 29 | A | 1.5 | 165 | 18 | 29 | 60–7 | 3,050 | 770 | 720 |
| II | 35 | B | 1.5 | 165 | 18 | 29 | 69–3 | 2,600 | 730 | 770 |
| III | 35 | A | 1.0 | 150 | 18 | 59 | 100–10 | 3,700 | 1,330 | 570 |
| III | 35 | B | 0.27 | 150 | 18 | 59 | 96–8 | 4,175 | 1,230 | 620 |
| IV | 35 | A | 1.0 | 165 | 18 | 82 | | | | |
| IV | 26 | B | 1.0 | 165 | 18 | 82 | | | | |

[1] Percent acrylonitrile in copolymer. [2] Uncured gum.
A—condensation product of Example I.
B—2,6-di-tertiary butyl-4-methyl phenol.
C—phenylbetanaphthylamine.

Example VII

The reaction product of Example I was added on a mill to an unstabilized copolymer of 97% isobutylene and 3% isoprene. After mixing the polymer was milled at 320° F. and the Mooney viscosity recorded after 15, 90, and 180 minutes of hot milling. The following results were obtained:

TABLE II

| Stabilizer | | 8 Min. Mooney Viscosity after Milling at 320° F. for— | | | |
|---|---|---|---|---|---|
| Type | Wt. Percent on Polymer | 0 Minutes | 15 Minutes | 90 Minutes | 180 Minutes |
| A* | 0.3 | 76 | 76 | 76 | 76 |
| B** | 0.3 | 76 | 76 | 73 | 51 |
| A* | 0.15 | 76 | 76 | 74 | 66 |

A*. Stabilizer of Example I.
B**. Phenylbetanaphthylamine.

The following results show that the additive causes no serious interference with the curing rate of the isobutylene-isoprene copolymer:

TABLE III

| Stabilizer | | Cure, Min. @ 307° F.ᵃ | Tensile | Modulus | | Elongation |
|---|---|---|---|---|---|---|
| Type | Wt. Percent on Polymer | | | @ 300% | @ 400% | |
| A | 0.2 | 20 | 2,925 | 550 | 840 | 820 |
| | | 40 | 2,925 | 790 | 1,190 | 720 |
| | | 80 | 2,875 | 1,070 | 1,580 | 660 |
| C | 0.2 | 20 | 3,000 | 480 | 770 | 820 |
| | | 40 | 2,950 | 740 | 1,110 | 750 |
| | | 80 | 2,775 | 1,030 | 1,560 | 630 |

ᵃ Compound as follows:

| | Parts by weight |
|---|---|
| Polymer | 100 |
| Zinc oxide | 5 |
| Stearic acid | 3 |
| Sulfur | 2 |
| Tetramethyl-thiuramdisulfide (Tuads) | 1 |
| Mercaptobenzothiazole (Captax) | ½ |
| Easy Processing Channel Black | 50 |

A—reaction product of Example I.
C—phenylbetanaphthylamine.

Example VIII

The reaction product of Example V was added as a sodium oleate water emulsion in isopropanol solution to an uncoagulated latex obtained by the emulsion copolymerization of 65% butadiene and 35% acrylonitrile. The latex was then coagulated with brine and acetic acid. The unvulcanized polymer was subjected to a temperature of 170° F. for 38 hours in a forced-draft drier. The following data were obtained in comparison with 2,6-di-tertiary-butyl-4-methyl phenol:

| | Mooney, 2 Min. at 212° F. | Williams Plasticity, 10 kg. at 80° C. |
|---|---|---|
| Polymer without stabilizer | 31 | 146-69 |
| Polymer with 2,6-di-tertiary-butyl-4-methyl phenol | 96 | |
| Polymer with stabilizer of Example V | 94 | 91-9 |

Example IX

The reaction product of Example V was added on a mill to an unstabilized copolymer, 85% isobutylene and 15% isoprene. After mixing, the polymer was milled at 270° F. and the Mooney viscosity recorded after 0 and 10 minutes of hot milling. The following results were obtained:

| Stabilizer | | 1½ Min. Mooney at 212° F. | |
|---|---|---|---|
| Type | Wt. Percent in Polymer | 0' | 10' |
| Product of Ex. V | 0 | 77 | 31 |
| Phenylbetanaphthylamine | 1 | 77 | 68 |
| | 1 | 77 | 65 |

Example X

The reaction product of Example I was added in a concentration of 0.25 weight percent on a mill to an unstabilized rubbery polymer of isobutylene having a molecular weight of 116,800. After mixing the polymer was milled at 300–350° F. and observations made on the molecular weight breakdown after the indicated time with the following results:

| | Stabilizer | |
|---|---|---|
| | A | B |
| Original polymer | 116,800 | 116,800 |
| after 30 minutes' milling | 90,300 | 95,780 |
| after 60 minutes' milling | 86,200 | 90,260 |
| after 75 minutes' milling | | 40,600 |
| after 90 minutes' milling | 81,600 | |
| after 120 minutes' milling | 75,900 | |
| after 135 minutes' milling | 79,000 | |

A—resorcinol-butadiene product of Example I.
B—2,6-di-tertiary-butyl-4-methyl phenol.

From the above data it is evident that with 0.25 weight percent concentration, 33% breakdown was obtained only after 120 minutes using the stabilizer of the present invention while 50% breakdown was obtained with 2,6-di-tertiary-butyl-4-methyl phenol in 75 minutes and in 13 minutes when no stabilizer was used.

Example XI

Samples of the copolymers of Examples VI and VII containing the addition agent of Example I were compounded with clay and cured to give white vulcanizates. These samples were placed on a metal surface covered with two coats of white enamel and exposed to the weather for 2½ months. The following results show that the condensation product is a low-staining stabilizer:

TABLE IV

| Polymer | Additive | | After 2½ Months' Exposure | |
|---|---|---|---|---|
| | Type | Wt. Percent on Polymer | Color of Rubber Slab | Enamel Underneath Slab |
| Buna-N | C | 1.0 | Dark Purple-Brown. | Stained Purple-Brown. |
| Do | B | 1.0 | Slight Yellow | Slight Yellow Stain. |
| Do | A | 1.0 | do | Do. |
| Do | A | 0.2 | do | Do. |
| Do | A | 0.1 | do | Do. |
| Butyl | C | 0.2 | do | Slight Purple-Brown Stain. |
| Do | A | 0.2 | Very Slight Yellow. | No Stain. |

A—condensation product of Example I.
B—2,6-di-tertiary butyl-4-methyl phenol.
C—phenylbetanaphthylamine.

Example XII

Instead of polyhydric phenols, phenol itself or its alkylation products such as mono alkyl or dialkyl phenol may be condensed with butadiene. For example, 59 parts of butadiene was reacted with 41 parts of phenol in the presence of a naphtha diluent using aluminum chloride catalyst at a temperature between 38° C. and 86° C. yielding a dark solid product having a softening point of 60° C. The following data illustrate the effectiveness of this product as an oxidation inhibitor for butyl rubber:

TABLE V

| Antioxidant | Days @ 110° C. | Staudinger Mol Wt. |
| --- | --- | --- |
| None (control) | 0 (before milling) | 34,600 |
|  | 0 (after milling) | 23,000 |
|  | 2 | 14,200 |
|  | 6 | 5,400 |
| 2,6 - di - tertiary - 4 - methyl phenol (0.25) | 0 | 34,200 |
|  | 2 | 34,200 |
|  | 6 | 31,600 |
| Phenol-butadiene (0.25%) Condensation product of Ex. VIII. | 0 | 34,000 |
|  | 6 | 20,800 |
| Diterpene-Diphenol (0.25%) Condensation Product. | 0 | 24,200 |
|  | 2 | 13,000 |
|  | 6 | (insoluble) |

The nature of the present invention having thus been described, what is claimed as new and useful and desired to be secured by Letters Patent is:

1. A high molecular weight elastomeric polymerization product of a feed containing at least a major proportion of aliphatic hydrocarbon compounds selected from the group consisting of mono-olefins and multi-olefins having from 4 to 14 carbon atoms per molecule and which is normally subject to deterioration in the presence of oxygen, which contains in admixture therewith a small quantity, sufficient to substantially reduce such deterioration, of the condensation product prepared by reacting a diolefin and a polyhydric phenol in the presence of a hydrate of ferric chloride, the said condensation product containing two aromatic nuclei.

2. A high molecular weight elastomeric polymerization product of a feed containing at least a major proportion of aliphatic hydrocarbon compounds selected from the group consisting of mono-olefins and multi-olefins having from 4 to 14 carbon atoms per molecule and which is normally subject to deterioration in the presence of oxygen, which contains in admixture therewith a small quantity, sufficient to substantially reduce such deterioration, of the condensation product prepared by reacting resorcinol and butadiene in the presence of a hydrate of ferric chloride, the said condensation product containing two aromatic nuclei.

3. A high molecular weight elastomeric polymerization product of a feed containing at least a major proportion of aliphatic hydrocarbon compounds selected from the group consisting of mono-olefins and multi-olefins having from 4 to 14 carbon atoms per molecule and which is normally subject to deterioration in the presence of oxygen, which contains in admixture therewith a small quantity, sufficient to substantially reduce such deterioration, of the condensation product prepared by reacting catechol and butadiene in the presence of a hydrate of ferric chloride, the said condensation product containing two aromatic nuclei.

4. A composition of matter comprising a low temperature rubber-like copolymer of a major proportion of isobutylene with a minor proportion of a multiolefin having from 4 to 14 carbon atoms per molecule together with 0.1 to 2% by weight of the copolymer of the condensation product prepared by reacting a diolefin and a polyhydric phenol in the presence of a hydrate of ferric chloride, the said condensation product containing two aromatic nuclei.

5. A composition of matter comprising a low temperature rubber-like copolymer of a major proportion of isobutylene with a minor proportion of a multiolefin having from 4 to 14 carbon atoms per molecule together with the condensation product prepared by reacting resorcinol and butadiene in the presence of a hydrate of ferric chloride, the said condensation product containing two aromatic nuclei.

6. A composition of matter comprising a low temperature rubber-like copolymer of a major proportion of isobutylene with a minor proportion of a multiolefin having from 4 to 14 carbon atoms per molecule together with the condensation product prepared by reacting catechol and butadiene in the presence of a hydrate of ferric chloride, the said condensation product containing two aromatic nuclei.

7. A composition of matter comprising a low temperature rubber-like copolymer of 97% isobutylene and 3% isoprene together with 0.1 to 2% by weight of the condensation product prepared by reacting resorcinol and butadiene in the presence of a hydrate of ferric chloride, the said condensation product containing two aromatic nuclei.

8. A composition of matter comprising a rubber-like polymer of isobutylene and the condensation product prepared by reacting a diolefin and a polyhydric phenol in the presence of a hydrate of ferric chloride, the said condensation product containing two aromatic nuclei.

9. Product of claim 8 in which the diolefin is butadiene and the polyhydric phenol is resorcinol.

10. Product of claim 8 in which the diolefin is isoprene and the polyhydric phenol is resorcinol.

11. A composition of matter comprising a low temperature rubber-like copolymer of a major proportion of isobutylene with a minor proportion of a diolefin together with the condensation product prepared by reacting a diolefin and a polyhydric phenol in the presence of a hydrate of ferric chloride, the said condensation product containing two aromatic nuclei.

12. A product of claim 11 in which the diolefin is butadiene and the polyhydric phenol is resorcinol.

13. A product of claim 11 in which the diolefin is isoprene and the polyhydric phenol is resorcinol.

WILLIAM F. AREY, JR.
ROBERT E. WOOD.

References Cited in the file of this patent

UNITED STATES PATENTS

| Number | Name | Date |
| --- | --- | --- |
| 2,371,550 | Schaad | Mar. 13, 1945 |
| 2,470,447 | Van Gilder | May 17, 1949 |

OTHER REFERENCES

Hackh's Chemical Dictionary, 3rd Ed., page 219, June 22, 1944. Blakiston Co., Philadelphia, Pa.

Webster's New International Dictionary, 2nd Ed., pages 555 and 556, 1939.